United States Patent [19]
Margolis et al.

[11] Patent Number: 5,570,286
[45] Date of Patent: Oct. 29, 1996

[54] REGENERATIVE SYSTEM INCLUDING AN ENERGY TRANSFORMER WHICH REQUIRES NO EXTERNAL POWER SOURCE TO DRIVE SAME

[75] Inventors: Donald L. Margolis, Elmacero, Calif.; Mark R. Jolly, Holly Springs, N.C.; Warren R. Schroeder, Davis, Calif.; Michael C. Heath; Douglas E. Ivers, both of Cary, N.C.

[73] Assignee: Lord Corporation, Cary, N.C.

[21] Appl. No.: 173,538

[22] Filed: Dec. 23, 1993

[51] Int. Cl.⁶ .................................................. B60G 17/00
[52] U.S. Cl. ................ 364/424.05; 280/703; 280/707; 280/772
[58] Field of Search .............. 364/424.05, 424.01; 280/707, 708, 703, 772; 114/124

[56] References Cited

U.S. PATENT DOCUMENTS

| | | |
|---|---|---|
| 887,505 | 5/1908 | Nelson et al. |
| 2,802,336 | 8/1957 | Ball .................................... 60/51 |
| 3,305,195 | 2/1967 | Eickmann ........................... 244/63 |
| 3,487,228 | 12/1969 | Kriegel ............................... 290/52 |
| 3,807,678 | 4/1974 | Karnopp et al. ............... 248/358 R |
| 3,880,446 | 4/1975 | Muller ............................... 280/708 |
| 3,921,746 | 11/1975 | Lewus ............................. 180/53 R |
| 4,204,405 | 5/1980 | Basham ............................. 60/371 |
| 4,295,538 | 10/1981 | Lewus ............................... 180/165 |
| 4,339,920 | 7/1982 | LeVan ............................... 60/533 |
| 4,359,867 | 11/1982 | Swanson ........................... 60/413 |
| 4,368,878 | 1/1983 | Meller .............................. 267/64.17 |
| 4,408,773 | 10/1983 | Meller et al. .................... 280/611 |
| 4,479,356 | 10/1984 | Gill .................................... 60/699 |
| 4,502,672 | 3/1985 | Meller et al. .................. 267/64.17 |
| 4,577,840 | 3/1986 | Meller et al. .................. 267/64.17 |
| 4,606,551 | 8/1986 | Toti et al. ........................ 280/772 |
| 4,655,440 | 4/1987 | Eckert ............................ 267/64.11 |
| 4,702,490 | 10/1987 | Yamaguchi et al. ............. 280/707 |
| 4,730,816 | 3/1988 | Eckert ............................ 267/64.11 |
| 4,793,583 | 12/1988 | Bergacker et al. ............... 248/550 |
| 4,811,919 | 3/1989 | Jones ................................. 244/54 |
| 4,817,550 | 4/1989 | Gutsche ........................... 114/124 |
| 4,869,474 | 9/1989 | Best et al. ....................... 267/136 |
| 4,872,701 | 10/1989 | Akatsu et al. ................... 280/703 |
| 4,949,573 | 8/1990 | Wolfe et al. .................... 73/118.1 |
| 5,018,698 | 5/1991 | Tobias ............................. 248/550 |
| 5,046,309 | 9/1991 | Yoshino ............................. 60/445 |
| 5,074,192 | 12/1991 | Gheorghita ......................... 91/407 |
| 5,082,308 | 1/1992 | Jones ............................... 280/707 |
| 5,098,119 | 3/1992 | Williams et al. .................. 280/707 |
| 5,101,929 | 4/1992 | Tobias ............................. 180/300 |
| 5,126,618 | 6/1992 | Takahashi et al. ............... 310/346 |
| 5,174,552 | 12/1992 | Hodgson et al. ............... 267/140.11 |
| 5,197,692 | 3/1993 | Jones et al. ....................... 244/54 |
| 5,219,152 | 6/1993 | Derrien et al. ................... 267/64 |
| 5,447,332 | 9/1995 | Heyring ........................... 280/772 |

*Primary Examiner*—Kevin J. Teska
*Assistant Examiner*—Dan Fiul
*Attorney, Agent, or Firm*—Randall S. Wayland; Richard K. Thomson

[57] ABSTRACT

A non-active regenerative system (20) which regenerates energy by taking energy from relative motion of members (22) and (24) and using it later to accomplish overall improved performance and eliminates the need for an active source to provide assisting forces. The non-active regenerative system (20) includes an energy transformer element (26) interconnecting a first member (22) and second member (24) which converts relative motion to an energy in storable form, and an energy management element (30) which channels the flow of energy to and from an energy storage element (32) to produce assisting forces. The energy management element (30) is commanded by a controller (36) which is responsive sensors (34a, 34b, 34c, and 34d) which provide signals indicative of the system condition. Power is supplied to the energy management (30), sensors (34a, 34b, 34c, and 34d), and controller (36), only if required, by power source (40). However, no active power source is needed to drive the transformer element (26). Embodiments of the non-active regenerative system (20) include non-active actuators and controllable mounts. Further, pulse width modulation of the energy management element (30) may be provided to reduce the system losses associated with tracking a desired force as dictated by a control algorithm.

20 Claims, 7 Drawing Sheets

REGENERATIVE SYSTEM INCLUDING AN ENERGY TRANSFORMER WHICH REQUIRES NO EXTERNAL POWER SOURCE TO DRIVE SAME

FIELD OF THE INVENTION

This invention relates to regenerative isolation systems. More specifically, the invention relates to the area of non-active systems which store energy from relative movement of bodies and release it at a later time to do useful work.

BACKGROUND OF THE INVENTION

Isolation systems are well known in the art, which include passive systems, semi-active systems, and active systems. Passive systems utilize passive isolating devices such as mounts and shock absorbers to isolate a suspended member from shock and vibration inputs. Although these systems provide adequate isolation, they can only dissipate energy from the system. Semi-active systems have been developed which vary the parameters of the isolation system in order to provide better isolation. One such semi-active system incorporating controllable dampers for providing a controllable damper force is described in the commonly assigned U.S. Pat. No. 3,807,678 to Karnopp et al. entitled "System for Controlling the Transmission of Energy Between Spaced Members" which is hereby incorporated by reference herein.

The Karnopp et al. '678 patent describes a passive spring 24 arranged in parallel spring relationship to an active viscous damper 26. The damping characteristics of the damper are varied as a function of feedback signals such as position, velocity, and acceleration. The damping is oscillated in real time between an off state (low damping) and an on state (high damping) responsive to these feedback signals. This on/off damping is accomplished via a control algorithm such as skyhook control, as will be understood by those skilled in the art. However, to accomplish ideal control of the vehicle via skyhook control, assisting as well as resistive forces need to be generated independently of the relative velocity.

A semi-active damper is only capable of generating a resistive damping force, i.e., a dissipative force which is opposed to the direction of travel. For optimum isolation, under certain conditions it is necessary to develop forces which are in the same direction as the direction of travel, i.e., assisting forces. Therefore, when the controller indicates that the desired force for optimum control is assisting, i.e., in the same direction as the damper motion, the response in a semi-active damper is to set the damper to a very low or zero damping (off state) setting. Again, this is because a damper can only provide dissipative forces so the best that the semi-active damper can do is to provide a low magnitude resistive force. As a result, because semi-active dampers are only capable of providing dissipative forces, they can never achieve optimum isolation.

Because of this perceived inadequacy, active systems have developed whereby, active pumps or other sources of active forces have been added to the system to provide the assisting forces dictated by the controller to provide optimum isolation. U.S. Pat. No. 4,625,993 to Williams et al. describes one such active system, whereby connection to a pump provides power to control the system. However, these systems have the disadvantage that they consume large amounts of energy.

To reduce the power requirements of active systems, U.S. Pat. No. 5,098,119 to Williams et al. and U.S. Pat. No. 5,082,308 to Jones describe systems which provide charging an accumulator and later releasing that energy. Although, active systems can provide improved isolation, they are extremely complex and require motors, pumps and the like, which add to the cost and detract from the durability of the system.

U.S. Pat. No. 4,730,816 to Eckert provides an apparatus for controlling spring stiffness of a shock absorber assembly by actuating valve 17 in response to controller 12. The system utilizes a rotary-type valve 17 to direct fluid flow to and from an accumulator 15. Although this system can vary the stiffness of the shock absorber, it cannot provide assisting forces.

Other systems are known which store energy for release at a later time such as the elastomer energy recovery system described in U.S. Pat. No. 4,479,356 to Gill wherein energy is stored via twisting of an elastomeric tube. U.S. Pat. No. 4,359,867 to Swanson describes storing fluid pressure from a vehicle seat suspension such that said pressure can be used as a hydraulic assist to operate the vehicle's clutch upon initial startup. U.S. Pat. No. 4,295,538 to Lewis which describes a system which takes energy from excursions of a vehicle strut to drive a hydraulic motor 48 which in turn drives generator 54 to generate electricity to power electrical devices used in a vehicle. Finally, U.S. Pat. Nos. 5,074,192 to Gheorghita, 5,046,309 to Yoshino, and 4,204,405 to Basham describe regenerative systems which store energy during one portion of a cycle for release in subsequent cycles.

SUMMARY OF THE INVENTION

Therefore, in light of the characteristics and drawbacks of the prior art, the present invention is directed to a non-active, regenerative system where inherent relative motion between members is converted into energy in storable form by an energy transformer and said energy is stored within an energy storage element as dictated by an energy management element and later released as dictated by said energy management element to improve the system performance and eliminate the need for an active power source for providing active forces into the system. The non-active system is essentially a controllable passive system as no external energy is needed to produce the assisting forces needed for optimum performance.

One embodiment of the present invention includes an on/off type non-active actuator which is controllable in real time and which stores energy from one portion of a cycle in an accumulator and releases it within that same cycle to accomplish optimal isolation by providing assisting forces without an active pump or other active-force-producing member. In another embodiment, the present invention may include a regenerative, controllable mounting incorporating an actuator/generator which is controllable in real time which stores energy from relative motion and later releases it in order to accomplish improved performance.

Another embodiment of the invention utilizes fluid within a regenerative elastomer mounting incorporating an actuator/generator which is controllable in real time to store energy from relative motion and later release it to accomplish improved performance. The present invention may take inputs from sensors to adjust the characteristics of the non-active regenerative system to provide improved vibration-reducing performance. In addition, the present invention may include means to provide pulse-width modulation of said energy management element in order to minimize the system energy dissipation associated with an unmodulated system.

It is an advantage of the present invention that the system provides improved isolation by using energy that would otherwise be dissipated. It is a further advantage that the non-active controllable device incorporating regeneration can accomplish optimum control by releasing energy back into the system at the appropriate time such that the device can provide assisting forces which are commanded by a controller, a feat not possible in prior art devices that did not include active force generators. In other words, it is an advantage of the non-active, regenerative controllable system that it requires no external energy source to provide active forces.

The abovementioned and further features and advantages of the present invention will become apparent from the accompanying descriptions of the preferred embodiments and attached drawings.

BRIEF DESCRIPTION OF THE DRAWINGS

The accompanying drawings which form a part of the specification, illustrate several embodiments of the present invention. The drawings and description together, serve to fully explain the invention. In the drawings.

DETAILED DESCRIPTION OF THE INVENTION

Figure 1:
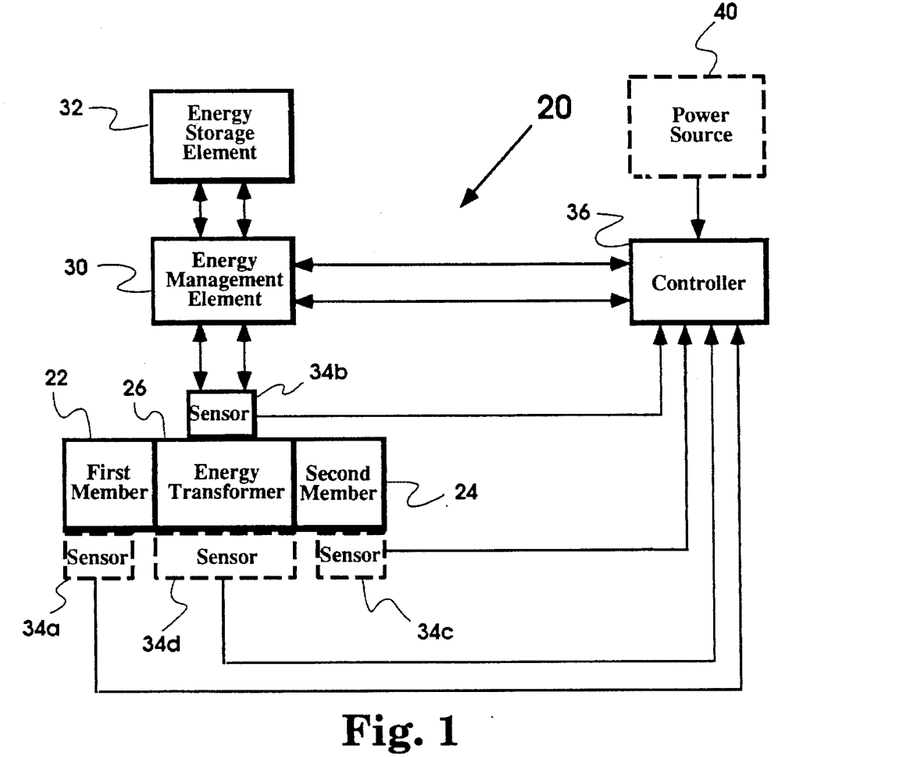
FIG. 1 is a block diagram illustrating a regenerative system.

The block diagram of FIG. 1 illustrates the non-active, regenerative system 20 of the present invention. Non-active, regenerative system 20 is used for attachment, interconnection, and controlling the transmission of vibrational energy between, a first member 22, such as a vehicle frame or body, to a second member 24 spaced apart therefrom, such as a vehicle axle, A-arm, or other suspension component. The first member 22 and second member 24 may also be an engine and support member, a vehicle cab and frame, or a vehicle seat and seat support, respectively. In most practical systems, a spring flexibly interconnects first and second members 22 and 24, although it is not essential to the operation of the regenerative system. It should be noted that this assembly can be advantageously placed between any two members 22, 24 experiencing relative vibratory motion and that energy can be stored at one point in time and released at a later point in time for shaping the system's vibratory response eliminating the need for an active-force-providing element.

In the block diagram of FIG. 1, an energy transformer 26 is connected between first and second members 22 and 24 and preferably includes a spring (not shown) in parallel spring relationship. The transformer 26 converts a portion of the kinetic energy associated with the relative vibratory motion between the members 22 and 24 into energy in storable or usable form such as electrical energy or energy of a pressurized fluid. An energy management element 30 is interconnected between the energy transformer 26 and an energy storage element 32 and directs, manages, or channels the flow of energy in usable or storable form to and from the energy storage element 32 according to a predetermined control algorithm for energy management.

The energy management unit 30 preferably takes the form of a network of valves or network of switches or relays. The energy management element 30 is actuated to dictate when energy is stored and when energy is released from an energy storage element 32, to perform useful work and control the transmission of vibratory energy between the first and second members 22 and 24. The energy storage element 32 preferably includes elements such as springs, accumulators, flywheels, inductors, capacitors, and the like. Sensors 34a, 34b, 34c, and 34d produce signals which are indicative of the condition of the system 20. Specifically, sensor 34b is the only sensor actually required and provides a signal indicative of the force condition in the system. A controller 36 controls the energy management element 30 via at least one control algorithm such that energy is channeled between energy transformer element and the energy storage element 32. The controller 36 is responsive to the sensor 34b providing a signal indicative of the force condition in the system.

The system 20 preferably includes a power source 40 for providing power for the sensors 34a, 34b, 34c, and 34d, the energy management element 30, and the controller 36; however, the transformer 26 may be the only source of power for the simplest configuration. Note, however, this power source 40 does not provide active forces, it only provides power to the non-force producing elements. In this simple configuration, the transformer 26 will generate all the power that is needed. The signal indicative of the force in the system provided by sensor 34b, may be derived directly from a force measurement or inferred or calculated from another measurement, such as pressure.

Figure 2A:
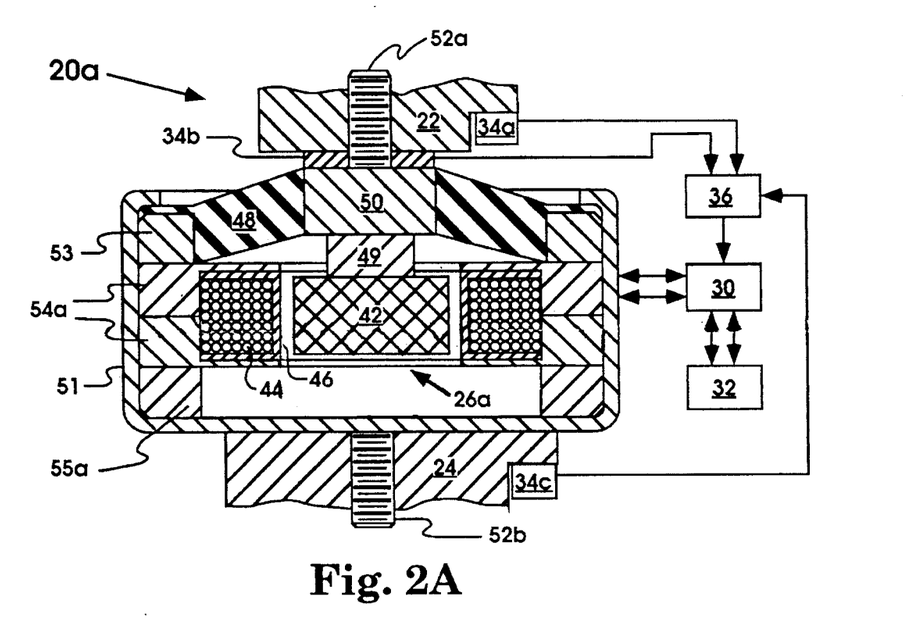
FIG. 2A is an electromagnetic embodiment of a controllable mount incorporating regeneration.

FIG. 2A illustrates an electromagnetic embodiment of a regenerative mount 20a which is attached between a first member 22 and a second member 24. The energy transformer element 26 is an electromagnetic device which can include a magnet 42 of the rare-earth type which has a puck shape and which interacts with coils 44 that are wound about annular bobbin 46. The coils 44 are preferably manufactured from copper and the bobbin from plastic, such as nylon or the like. The mount 20a includes an inner member 50 which is puck-shaped and an outer member 53 which is annular-shaped and an elastomer section 48 of conical-shape integrally bonded to each member 50 and 53 by methods known to those skilled in the art. The elastomer material used could be natural rubber, polybutadiene, natural rubber blend, or the like. The magnet 42 is spaced apart from inner member 50 by preferably nonmagnetic spacer 49.

The elastomer section 48 acts as a spring in parallel spring relation to the energy transformer element 26 and functions to support static loads and provide axial, radial and cocking stiffness. Preferably, the radial stiffness and cocking stiffness are high enough to prevent magnet 42 from contacting bobbin 46. Of course, the elastomer section 48 could include laminated elastomer and shim construction to provide a high radial stiffness. Opposed and identical retainers 54a of annular-shape are made of preferably nonmagnetic material and constrain bobbin 46 from axial and radial movement relative to a housing 51. Housing is preferably made of stamped steel construction. A block 55a of annular shape properly spaces retainers 54a such that the coil 44 is properly aligned with the magnetic field produced by the magnet 42.

Electrical energy in storable form is generated by energy transformer element 26 via the motion of first member 22 relative to the second member 24. Movement of the magnet 42 past the wound coil 44 causes a current to flow in coil 44. That current passes through energy management element 30 when allowed to do so, and the electrical energy can be stored as energy in usable or storable form in energy storage element 32. The energy in storable form can then be released from the energy storage element 32 and used to drive energy transformer 26 according to a control algorithm.

In this embodiment, the energy management element 30 can be a plurality of, or network of electrical switches or electrical relays. The energy storage element 32 can be a capacitor, an inductor, or the like. The controller 36 receives inputs from sensors 34a, 34b, 34c, and 34d which provide signals which are indicative of the system condition. Sensor 34a may be an acceleration sensor which provides a signal indicative of acceleration of the first member adjacent the inner member 50. This signal can be processed by the controller 36 to provide absolute velocity by integrating once and absolute displacement by integrating twice. Sensor 34b provides a signal indicative of force acting on mount 20a. Likewise, 34b could also be placed on the other side of mount 20a adjacent second member 24. Sensor 34c may provide a signal indicative of the acceleration of second member 24 adjacent housing 51. Again, integration can provide absolute velocity and absolute displacement. The mount 22a also includes means for attaching to first and second members 22 and 24, such as fasteners 52a and 52b shown. A secondary coil and magnet arrangement can be provided in the mount to provide relative velocity measurements if desired.

A control algorithm is included in the controller 36 and is used for control of the mount 20a. The controller 36 provides means for calculation of the desired condition of the system, means for comparing the desired force condition with the actual force condition, and means for controlling the energy management element 30 such that energy in usable or storable form is either stored or released from the energy storage element 32 at the appropriate time. Controller 36 may contain a series of separate controllers within it each performing separate functions, such as a separate isolation controller, and a separate energy management controller.

Furthermore, the controller may include means for pulse width modulating the energy management element 30. Pulse width modulation includes modulating the energy management element 30 between a full off state and a full on state at high frequency (preferably at 15 ms or higher, for one application) such that the desired force condition is arrived at on the average, i.e., is substantially tracked on the average. Pulse width modulation has the advantage that it creates the same desired system condition or force as an unmodulated system, yet minimizes the losses associated with an unmodulated system. This is because the energy management element is completely closed or completely open, both of which are substantially loss-free conditions. An unmodulated system may include a variable switch including a variable resistor to provide the appropriate power to the energy transformer element 26 when energy is released such that the desired system condition is tracked. Of course, this approach will dissipate energy within the energy management element 30, something that is not desired in a regenerative system.

It should be understood, that the optimal system will theoretically have zero losses such that all the energy that flows into the energy transformer is stored and subsequently used. However, it will be appreciated that in practical systems, such as that of the present invention, some losses are inevitable. In a mounting 20a such as the one described, any excess energy not needed to provide assisting forces and which builds in the system may be used to charge a power source 40 which powers the sensors 34a, 34b, 34c, and 34d, controller 36, and energy management element 30 or, alternatively, be used for other purposes.

Figure 2B:
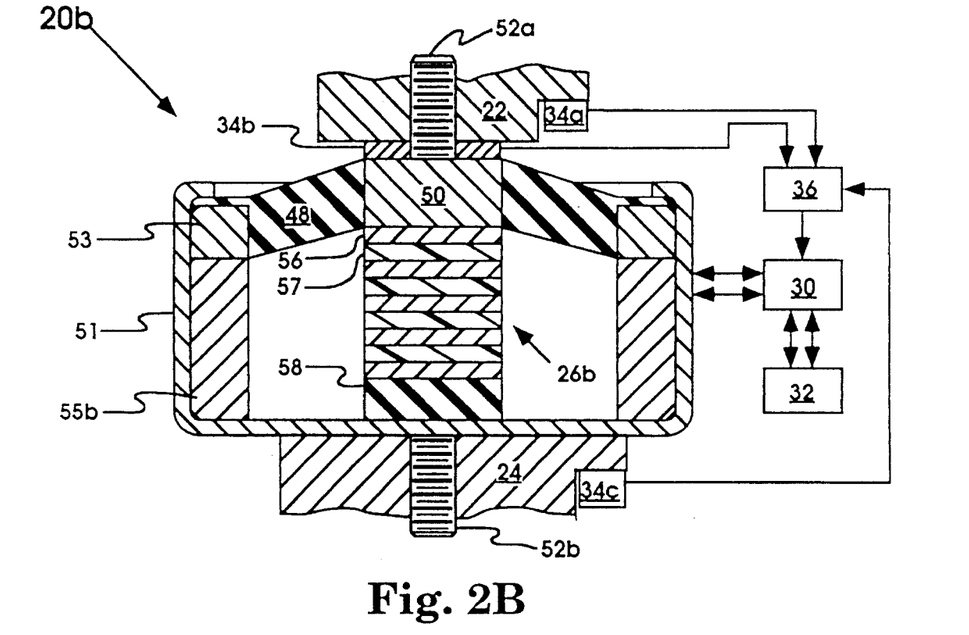
FIG. 2B is an piezoelectric embodiment of controllable mount incorporating regeneration.

FIG. 2B illustrates a piezoelectric embodiment of regenerative mounting 20b. The mounting 20b includes all the features previously mentioned in relation to the electromagnetic embodiment of FIG. 2A except that the energy transformer 26 in this embodiment is a piezoelectric actuator. The energy transformer 26 includes stacked piezoelectric elements including alternating metal shims 56 and layers of piezoelectric material 57. Stacked piezoelectric elements are taught in U.S. Pat. No. 5,126,618 to Takahashi et al. which is hereby incorporated by reference herein. An elastomer decoupler 58 is provided which is soft in the radial direction. Further, the elastomer decoupler 58 and energy transformer element 26 are in series spring relationship. However, the combination of the elastomer decoupler 58 and energy transformer element 26 are in parallel spring relationship to the elastomer section 48. In essence, the elastomer decoupler 58 keeps the energy transformer 26 from experiencing any substantial side loads, yet allowing the device to transmit axial loads effectively. The piezoelectric element can be used as either an actuator or a generator. Furthermore, a separate piezoelectric element could be placed in series with the energy transformer element 26 to provide the force condition of the mounting 20b. In this embodiment, the energy storage element 32 can be a capacitor, inductor or the like, and the energy management element 30 can be a network of, or plurality of switches or relays.

Figure 3:
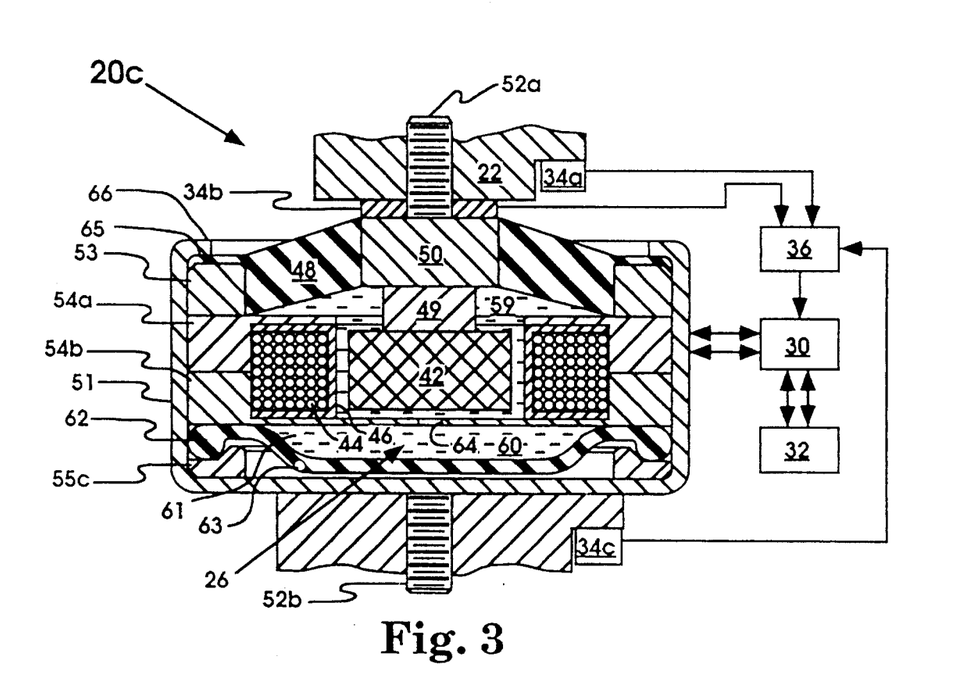
FIG. 3 is an electromagnetic embodiment of a fluid and elastomer controllable mount incorporating regeneration.

FIG. 3 illustrates a fluid mounting 20c which includes regeneration. The mounting 20c includes all the features previously mentioned in relation to the electromagnetic embodiment of FIG. 2A except that the energy transformer 26 in this embodiment is disposed within the environment of a fluid mounting 20c.

The fluid mounting 20c includes a first fluid chamber 59 formed at least partially by elastomer section 48 and retainers 54a and 54b. A portion of retainer 54b acts as a partition. A second fluid chamber 60 is formed at least partially by retainer 54b and diaphragm 63. A passageway 64 interconnects the first fluid chamber 59 and second fluid chamber 60. A fluid 61 is contained within, and substantially fills, the first fluid chamber 59, second fluid chamber 60, and passageway 64. Mechanically staking of crimp 66 will compress seals 62 and 65 and form fluid tight seals such that fluid cannot escape from chambers 59 and 60. In usage, actuation of energy transformer element 26 will cause fluid 61 to flow through passageway 64. This can be used to shape the frequency response of the fluid mounting 20c. Inertia of the fluid 61 in passageway 64 can also be tuned as is known to those skilled in the art and which is described in commonly assigned U.S. Pat. Nos. 5,197,692 to Jones et al. and 5,174,552 to Hodgson et al., both of which are hereby incorporated by reference herein.

Figure 4A:
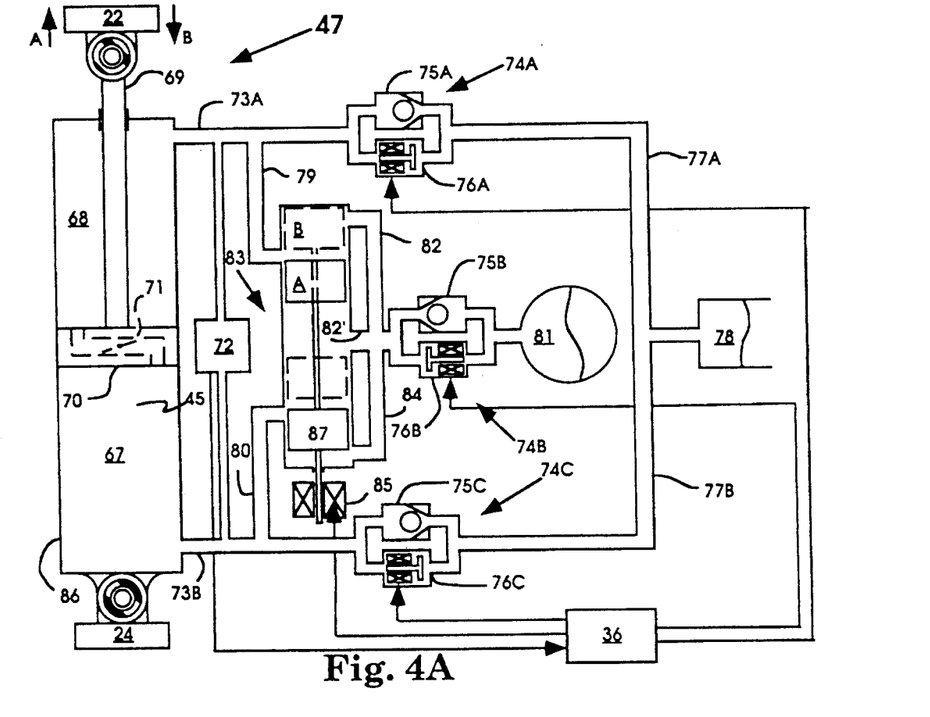
FIG. 4A is a controllable actuator incorporating regeneration.

FIG. 4A illustrates a non-active regenerative actuator 47. The actuator 47 includes a housing or cylinder 86 which telescopically receives a piston 70. Together, the cylinder 86 and piston 70 make up the assembly which performs the energy transformer function. The piston 70 divides the internal chamber into two opposed fluid chambers including a first fluid chamber 67 and a second fluid chamber 68. Piston rod 69 attaches to piston 70 at one end and includes attachment means, such as bushing shown, on the other end for attaching to a first member 22. An elastomer bushing integral to housing 86 provides the means for attaching to the second member 24. As the piston 70 within cylinder 86 is actuated by the relative movement of members 22 and 24, a fluid 45 contained within and substantially filling the entire actuator 47 is transferred through channels 73A and 73B depending on the direction of travel of piston 71. Travel in the direction of arrow A will cause fluid 45 to flow into channel 73A and out of channel 73B. Travel in the direction of arrow B will cause fluid 45 to flow out of channel 73A and into of channel 73B. A sensor 72 can sense the pressure differential between the opposed first and second fluid chambers 67 and 68. A condition indicative of force in the system can be derived from the pressure readings.

This embodiment of the actuator 47 includes a network of valves which control the flow of fluid 45 to and from an energy storage element 78, which in this case is an air charged accumulator. A portion of the network of valves also controls fluid flow to and from plenum 81 which provides the system with additional fluid. Fluid 45 flows to and from energy storage element 78 through channels 77A and 77B and through valves 74A and 74C. Valves 74A, 74B, and 74C include check valves 75A, 75B, and 75C and controllable valve members 76A, 76B, and 76C. A spool valve 83 controls the flow of fluid 45 to and from plenum 81 and controls the flow of fluid 45 through channels 79 and 80. Spool valve 83 includes a plurality of lands 87 and an actuating member 85. Channels 82, 82', and 84 receive fluid flow dictated by spool valve 83. Valve 74B ultimately controls flow of fluid 45 to and from plenum 81.

A controller 36 controls the operation of the valve network and accomplishes the energy storage and release, i.e., the energy management function. Controller 36 may also include a separate controller element for determining and providing a desired target force required for optimum isolation of the system. Dependent on the direction of travel and the desired force required, valves 83, 74A, 74B, and 74C will be actuated to either store energy or release the stored energy and utilize it to provide assisting forces. An optional bypass valve is provided to provide pressure relief where the pressure differential is extreme. A bypass valve also may be used to provide damping to the system under rare occasions when damping might be required.

Figure 4B:
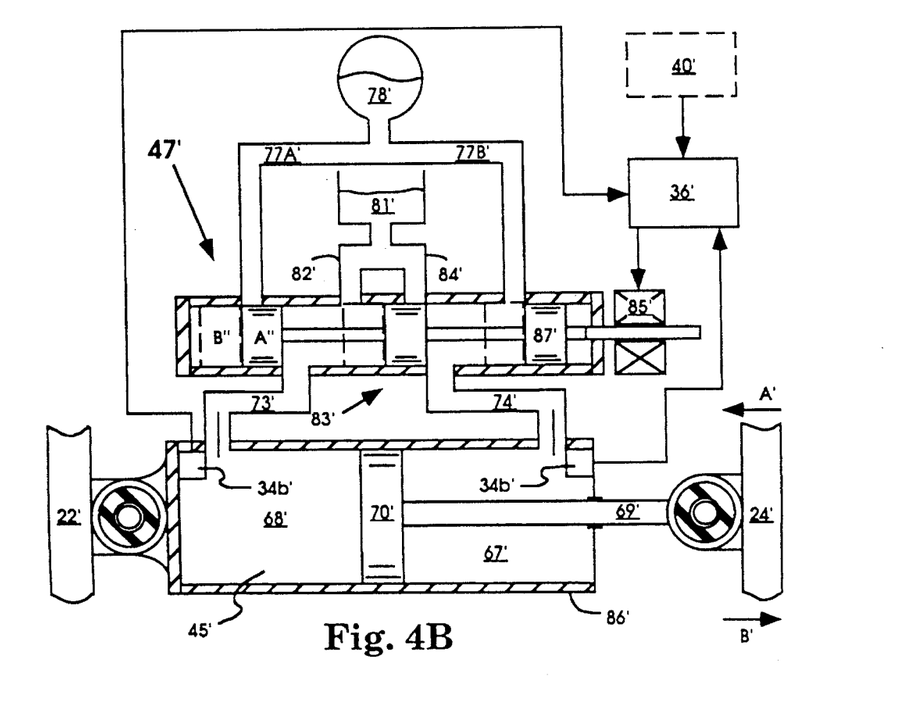
FIG. 4B is another embodiment of controllable actuator incorporating regeneration.

In FIG. 4B another embodiment of a non-active actuator 47' is interconnected between members 22' and 24' which undergo relative vibratory movement. In this embodiment, the energy management element is provided by a network of valves which includes a spool valve 83'. Actuation of spool valve 83' via actuator member 85' positions plurality of lands 87' at a variety of positions, two of which are shown as A" and B". As an example of the operation of the actuator 47', when piston 70' is actuated in the direction of arrow A', fluid 45' can flow to the accumulator 78' only when spool valve 83' is commanded to position B", thus allowing fluid 45' to charge the accumulator 78' by fluid flow through channels 73' and 77A'. The system will charge itself when the desired force is available and thus there is excess energy that can be stored. If the transformer element is unable to generate the desired force dictated by the controller 36', then valve 83' will be actuated to position A" such that high pressure fluid travels from accumulator 78' through channels 77B' and 74' to assist in providing the desired assisting force required. The accumulator 78' acts as an energy storage element.

Likewise, when piston 70' is actuated in the direction of arrow B', fluid 45' will flow to the energy storage element 78' only when spool valve 83' is commanded to position A", thus allowing fluid to charge the accumulator 78' by fluid flow through channels 74' and 77B'. However, when a condition requiring an extension force is sensed, i.e., an assisting force, the valve 83' will be actuated to position B" such that energy is released from accumulator 78'.

A position intermediate to positions indicated by A" and B" will block flow from and to channels 77A' and 77B' and allow fluid 45' to flow through channels 73', 82', 84' and 74' such that there is essentially unrestricted flow between chambers 67' and 68', thus providing a zero force mode. A zero force mode may be required for some control conditions.

Plenum 81' operates to provide a place for the fluid 45' to go which is displaced by the movement of piston rod 69' and replenishes system fluid when fluid is stored in accumulator 78'. Again, controller 36' controls the positioning of spool valve 83' and receives inputs from sensors 34b' indicative of the force condition of the system. Specifically, sensors 34b' are pressure sensors and provide the pressure within each of chambers 67' and 68' at any point in time. Preferably, a power source 40' can be provided to power sensor 34b, controller 36, and actuator member 85'. However, a magnet and coil member could be provided in the system to provide the power required to operate the non-force producing members the system. 0f course, this may result in less than optimal isolation during a startup or initial charging period because controller 36', sensor 34b', and energy management elements will not function properly until powered.

The controller 36' includes means for calculating the desired force to be exerted based upon a control algorithm. The controller 36' receives inputs indicative of the force condition in the system. The controller 36' also includes means for comparing the manipulation of the pressure signal to derive actual force with the desired force. The controller 36' then decides if energy is to be stored or released to provide the desired force that is required for optimum control. If the transformer element, i.e., the piston 70' and cylinder 86' assembly, can provide the force required, then any excess energy is stored in the accumulator 78'. However, if the desired force cannot be generated by the energy transformer, then energy is released from the energy storage element via release of high pressure fluid from accumulator 78'. In this manner, the desired or commanded force is substantially tracked or followed.

Figure 5:
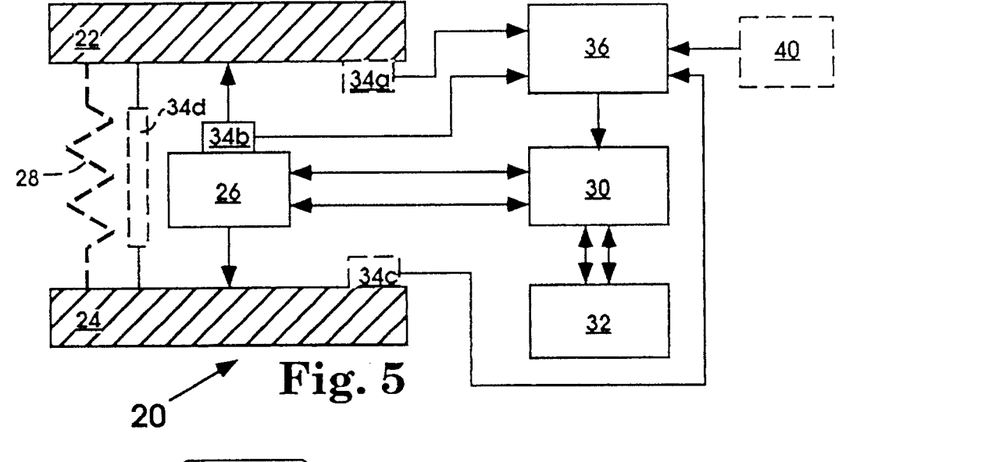
FIG. 5 is a block diagram of a system including an actuator incorporating regeneration.

FIG. 5 illustrates a simple block diagram of the suspension embodiment of non-active regenerative system 20. The essential elements are an energy transformer 26, and energy management element 30, an energy storage element 32, a controller 36, and a sensor 34b for providing a signal indicative of the force acting in the system. The other elements including spring 28, sensors 34a, 34c, and 34d, and power source 40 are usually provided in most systems, but are not essential. For instance, signals from sensors 34a, 34c, and 34d are provided to controller 36 for determining the control to be initiated according to a primary control algorithm. Within controller 36 there may be separate controller elements which provide for energy management control and primary response control, i.e., controlling the response to specific suspension inputs. Examples of primary response are found in the skyhook control system as taught in Karnopp '678 or deflection control as taught in copending application number 07/799,501 filed Nov. 27, 1991, now U.S. Pat. Nos. 5,276,623, entitled "System for Controlling Suspension Deflection".

Figure 6A:
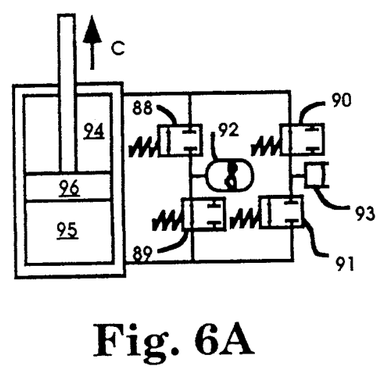
FIGS. 6A, 6B, 7A, 7B, 8A, and 8B illustrate the various energy storage and release states of fluid and electrical versions of the regenerative system.
Figure 7A:
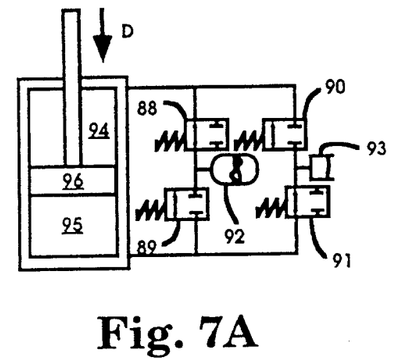
Figure 8A:
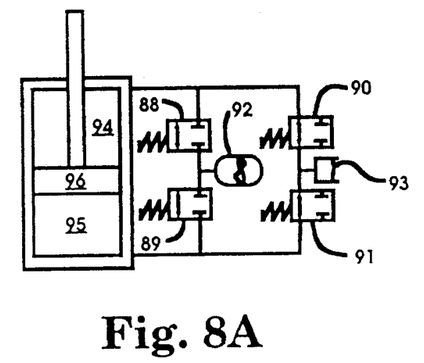

FIGS. 6A, 7A, and 8A illustrate the possible valve positions or states of the hydraulic regenerative actuator. In FIG. 6A the piston 96 is actuated in the direction of arrow C. Valve 88 is closed and valve 89 is open. Thus, fluid flows at high pressure from accumulator 92 to assist in moving piston 96. This releases energy in storable form from accumulator 92 to do useful work, i.e., help in moving piston 96 and provides assisting forces. As mentioned before, the prior art was incapable of providing motion-assisting forces without an active pump of some sort. As piston 96 moves in direction of arrow C, valve 90 is open and valve 91 is closed such that plenum 93 fills with the fluid displaced.

In FIG. 7A the piston 96 is actuated in the opposite direction of arrow C of FIG. 6A as indicated by directional arrow D. Valve 88 is open and valve 89 is closed. Thus, fluid flows at high pressure from accumulator 92 to assist in moving piston 96 in the direction of arrow D. This releases energy in storable form from accumulator 92 to do useful work, i.e., help in moving piston 96. As piston 96 moves in direction of arrow D, valve 90 is closed and valve 91 is open such that plenum 93 fills with the fluid displaced.

In FIG. 8A the piston 96 can be actuated in either direction and zero force is provided. Both valves 88 and 89 are closed. Thus, fluid at high pressure remains stored in accumulator 92 to assist in moving piston 96 at a later point in time. Valve 90 is open and valve 91 is also open such that there is free fluid flow between chambers 94 and 95. Any increase or decrease in volume of the system due to piston rod volume entering or leaving chamber 94 is accommodated by plenum 93 which fills with the fluid displaced.

Figure 6B:
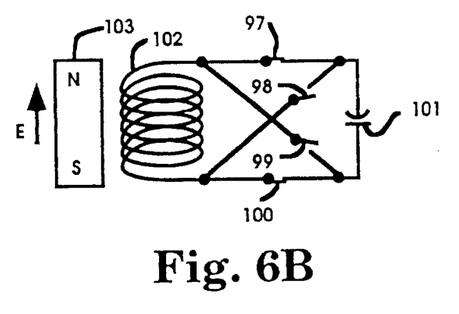
Figure 7B:
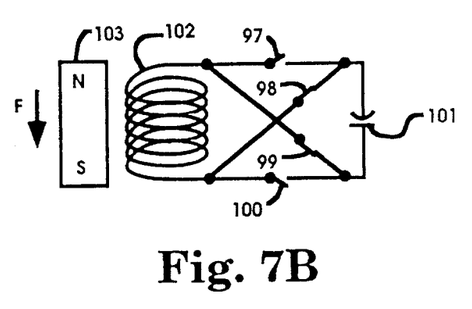
Figure 8B:
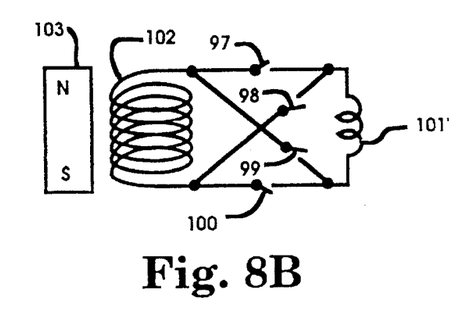

FIGS. 6B, 7B, and 8B illustrate electrical versions of the regenerative system. Specifically, FIG. 6B illustrates actuation of the magnet 103 to provide a force in the direction of arrow E. Switch 97 is closed, switches 98 and 99 are open, and switch 100 is closed. Together, this network of switches comprise the energy management element. Thus, electricity flows from energy storage element such as capacitor 101 to assist in moving magnet 103 via providing a magnetic field due to current flow through coil 102 and producing a field opposed to the magnetic field of the magnet 103. This releases energy in storable form from capacitor 101 to do useful work and provides assisting forces. As mentioned before, providing motion-assisting forces was not possible with the prior art devices without the added expense of a pump or the like.

FIG. 7B illustrates actuation of the magnet 103 to provide a force in the direction of arrow F opposite of direction of actuation in FIG. 6B. Switch 97 is open, switches 98 and 99 are closed, and switch 100 is open. Thus, electricity flows from capacitor 101 to assist in moving magnet 103.

FIG. 8B illustrates actuation of the magnet 103 to provide a zero force. All switches 97, 98, 99 and 100 are open. Thus, no electricity flows from inductor 101' to assist in moving magnet 103. As described earlier, an inductor 101' is an alternate energy storage element.

Figure 9:
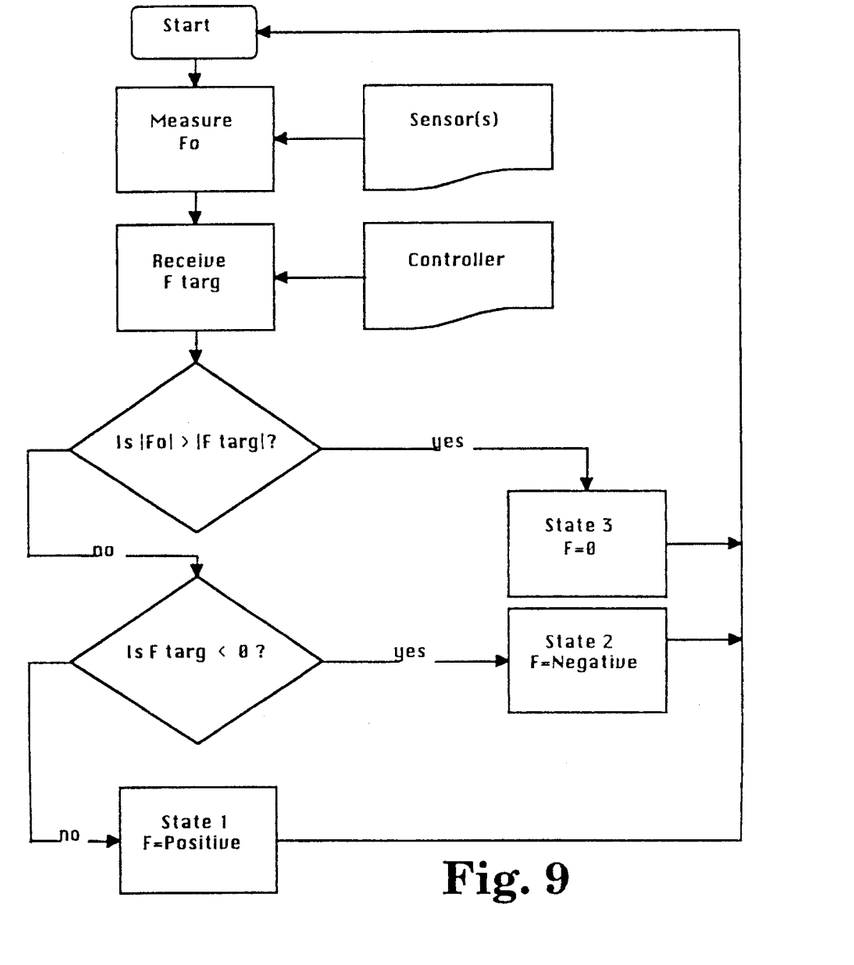
FIG. 9 is a flow diagram illustrating a control algorithm for the regenerative system.

FIG. 9 illustrates a flow diagram of one control algorithm. The algorithm functions in a fast return loop environment, where the system is constantly updating the measurements and calculations in real time. The force $F_o$ in the system is measured and compared with a target force $F_{targ}$ which is calculated, for example by a primary controller. If the absolute value of the force is greater than $F_{targ}$ then state 3 is commanded and zero force is provided. If the absolute value of $F_o$ is not greater than the absolute value of $F_{targ}$ and $F_{targ}$ is less than 0, then state 2 occurs and a negative force is applied. When the absolute value of $F_o$ is not greater than the absolute value of $F_{targ}$ and $F_{targ}$ is positive, then state 1 occurs an assisting force is applied.

Figure 10:
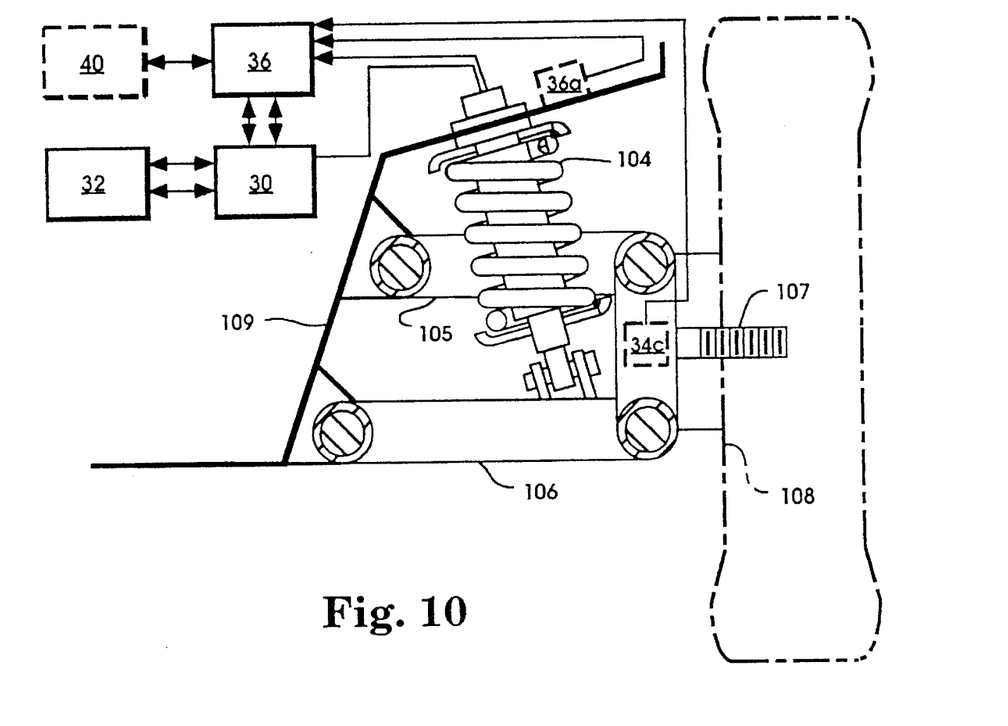
FIG. 10 is an illustration of a regenerative system in a primary vehicle suspension.

FIG. 10 illustrates a primary suspension system including a non-active regenerative actuator 104. The actuator 104 interconnects between a body 109 and a suspension component. In this embodiment, the suspension component is a second A-arm 106. The suspension includes first A-arm 105, a second A-arm 106, and spindle 107 with tire and wheel assembly 108 attached thereto. The actuator 104 may include an internal LVT as is taught in the commonly assigned U.S. Pat. No. 4,949,575 which is hereby incorporated by reference herein. The actuator includes (a) sensor(s) to measure the force across it. The non-active system stores energy during excursions and uses it to accomplish control of the actuator and provide assisting forces without requiring an active pump or the like.

Figure 11:
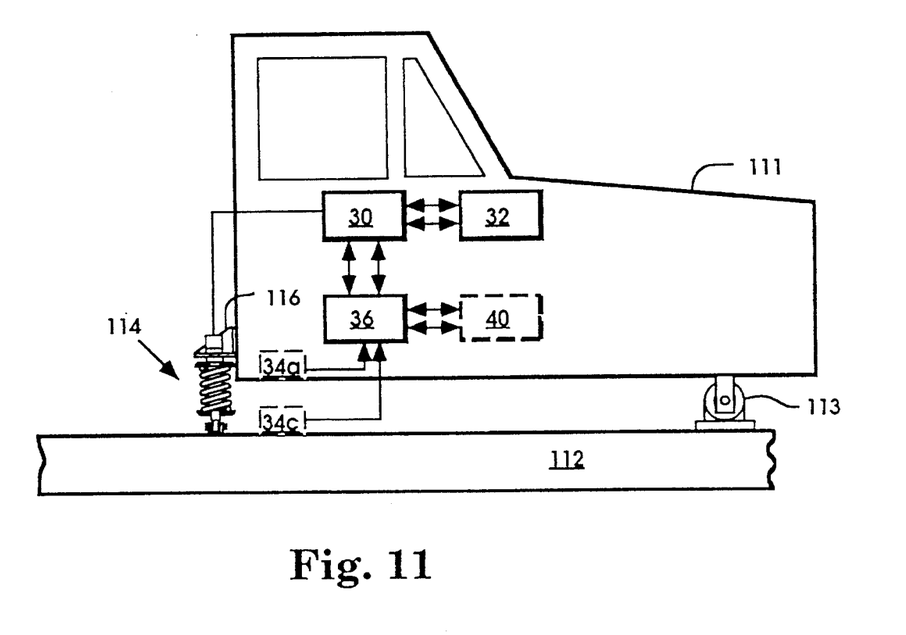
FIG. 11 is an illustration of a regenerative system in a vehicle cab suspension.

FIG. 11 illustrates a cab suspension system including a non-active regenerative actuator 114. Suspensions on truck cabs 111 are desirable to provide isolation of the cab 111 from road inputs, and specifically, the beaming mode of the frame 112 of the truck. Typically, suspension pivot members 113 (only one shown, generally one is mounted on the front left and front right portions of the cab 111 ) are provided adjacent the front of the cab 111 to provide a point about which the rear portion of the cab 111 can pivot. Members 113 may also be elastomeric and provide vertical isolation as well. Actuator 114 or a plurality of actuators 114 interconnect frame 112 to cab 111. Bracket 116 aids in installation of actuator(s) 114. Again, actuator 114 may include an integrated LVT or LVDT. In the cab suspension, regeneration can be used to provide optimum isolation by storing energy and using that stored energy to provide assisting forces. This eliminates the need for using active devices such as pumps or motors.

Figure 12:
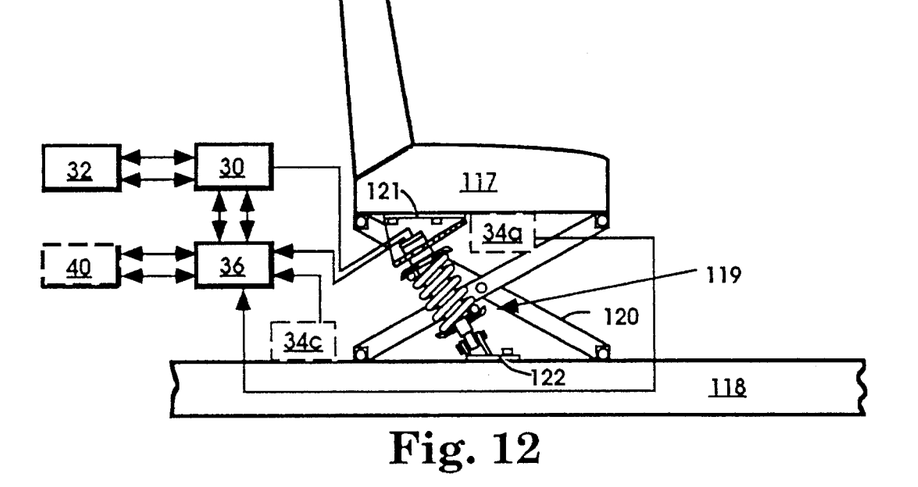
FIG. 12 is an illustration of a regenerative system in a seat suspension system.

FIG. 12 illustrates a seat suspension system including a non-active regenerative actuator 119. Actuator 119 is attached between seat 117 and seat support 118. Seat suspension includes X-shaped scissors members 120 which restrict the seat 117 motions to movements the vertical axis only. Brackets 121 and 122 attach actuator 119 to the bottom of seat 117 and the seat support 118, respectively. The regenerative seat suspension system uses energy stored from one portion of a cycle to provide optimum isolation to the seated person without any active pumps, etc.

Figure 13:
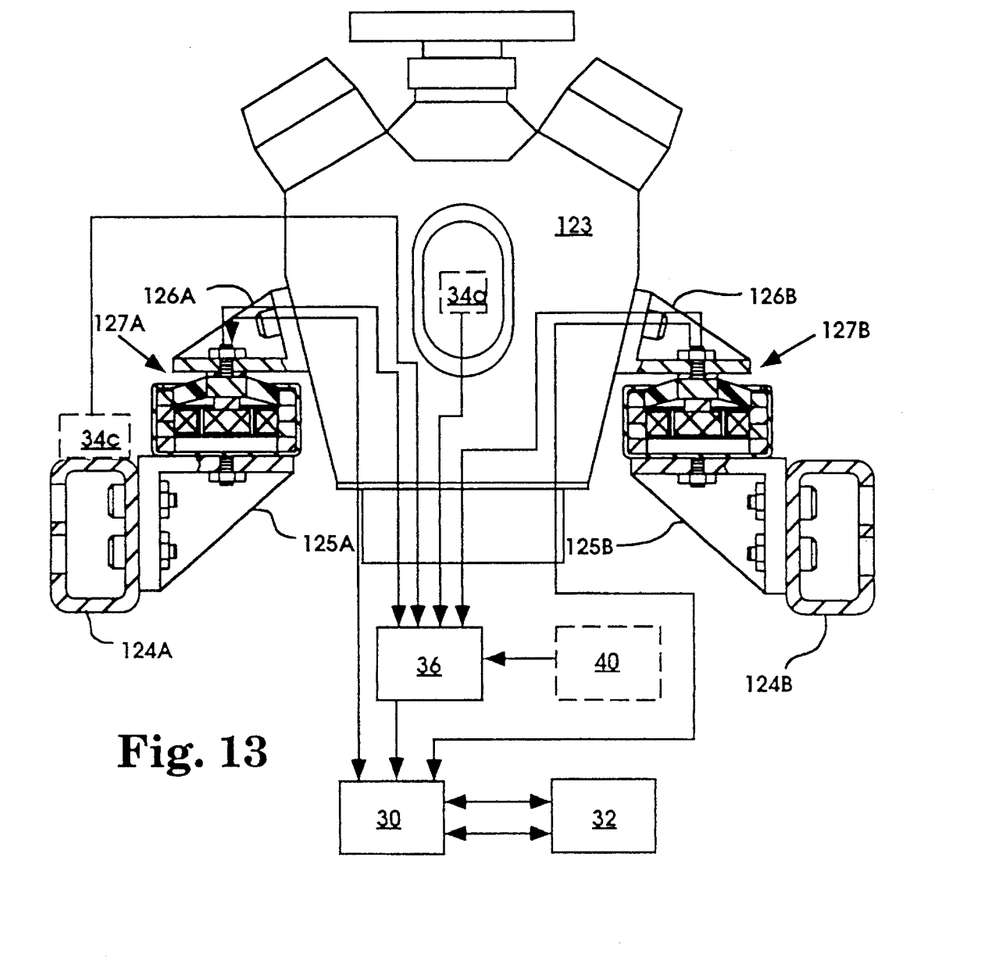
FIG. 13 is an illustration of a regenerative system in an engine suspension system.

FIG. 13 illustrates a non-active engine suspension system including regenerative mounts 127A and 127B. Regenerative mounts 127A and 127B as described in FIG. 2A support engine 123 and utilize energy regeneration to minimize the transmission of engine vibrations to the frame. Of course, mounts of the type described in FIG. 2B and FIG. 3 could also be used. Mounts 127A and 127B attach between engine 123 and frame members 124A and 124B via brackets 125A, 126A and 125B, 126B. Mounting forces can be varied by release of stored energy to control resonances and for providing improved isolation. Mounts may include internal LVT's or LVDT's to provide signals indicative of the condition of the mounting. Sensors 34a and 34c may provide acceleration readings of the frame 124A, 124B or engine 123, or both and may be positioned at any point about the engine 123 and frame 124A, 124B. Multiple sensors could also be used. Sensors providing the force across each mount (not shown) are also required. Power source 40 is optional as the mounts 127A, 127B themselves can be used to generate the power needed to power controller 36, energy management element 30, and sensors 34a, 34b.

While several embodiments of the present invention have been described in detail, various modifications, alterations, changes and adaptations to the aforementioned may be made without departing from the spirit and scope of the present invention defined in the appended claims. It is intended that all such modifications, alterations, and changes be considered part of the present invention.

What is claimed is:

1. A regenerative system for controlling the transmission of vibrational energy between a first member and a second member which undergo relative vibratory motion, said regenerative system operating without an auxiliary power source for actively providing assisting forces and comprising:

a) an energy transformer for converting kinetic energy from said relative vibratory motion between said first and said second members to energy in storable form and for utilizing said energy in storable form for performing useful work between said first member and said second member by controlling transmission of vibrational energy between said members;

b) an energy storage element for storing said energy in storable form from said energy transformer;

c) a sensor associated with said system for providing a signal indicative of a force condition of said regenerative system;

d) an energy management element interconnected between said energy transformer and said energy storage element for channeling said energy in storable form converted by said energy transformer to and from said storage element; and e) a controller responsive to said sensor for controlling said channeling of said energy in storable form to and from said energy storage element such that said energy in storable form is stored and released to provide assisting forces in response to said relative vibratory motion without the need for an auxiliary power source for actively driving said energy transformer for providing assisting forces.

2. The system of claim 1 wherein said energy transformer is an electromagnetic device, said energy storage element is one from the group consisting of a capacitor and an inductor, and said energy management element is a network of switches.

3. The system of claim 1 wherein said energy transformer is a piezoelectric actuator, said energy storage element is one from the group consisting of a capacitor and an inductor, and said energy management element is a network of switches.

4. The system of claim 1 wherein said energy transformer is a hydraulic piston and cylinder assembly, said energy storage element is an accumulator, and said energy management element is a network of valves.

5. The system of claim 1 wherein said controller includes means for calculating the desired force to be exerted based upon a control algorithm, means for comparing a manipulation of said signal indicative of said force condition of said system to said desired force to be exerted, means for commanding storage of excess of said energy in storable form via control of said energy management element if said desired force can be adequately generated by said energy transformer and means for commanding release of said energy in storable form from said storage element via control of said energy management element when said desired force cannot be adequately generated by said energy transformer such that said desired force dictated by said control algorithm is substantially tracked.

6. The system of claim 5 wherein said energy management element includes means for pulse width modulating between a full off state and a full on state at high frequency to substantially track said desired force on the average, thereby reducing the losses associated with commanding said energy management element to an intermediate setting.

7. A controllable mount for interconnecting a first member and a second member which undergo relative motion, said controllable mount operating without an auxiliary power source for actively providing assisting forces and comprising:

a) an energy transformer associated with said controllable mount for transforming kinetic energy from said relative vibratory motion between said first and said second member to an energy in storable form and for releasing said energy in storable form for performing useful work between said first member and said second member to reduce said relative motion;

b) a spring mounted in parallel spring relation to said energy transformer which functions to support static loads and provide axial, radial, and cocking stiffnesses;

c) an energy storage element for receiving said energy in storable form from said energy transformer;

d) a sensor associated with said controllable mount for providing a signal indicative of a force condition of said system;

e) an energy management element interconnected between said energy transformer and said energy storage element for channeling said energy in storable form to and from said storage element; and f) a controller responsive said sensor for controlling said channeling of said energy in said storable form to and from said energy storage element such that said energy in said storable form is stored at a first point in time and released during a later point in time without an auxiliary power source for actively driving said energy transformer for providing assisting forces.

8. The controllable mount of claim 7 wherein said energy transformer is an electromagnetic actuator, said energy storage element is one from the group consisting of a capacitor and an inductor, and said energy management element is a network of switches.

9. The controllable mount of claim 7 wherein said energy transformers are piezoelectric actuators, said energy storage element is one from the group consisting of a capacitor and an inductor, and said energy management element is a network of switches.

10. The controllable mount of claim 7 further including a first fluid chamber, a second fluid chamber, a passageway interconnecting said first and said second fluid chambers, and a fluid contained within, and substantially filling, said first fluid chamber, said second fluid chambers, and said passageway.

11. The controllable mount of claim 7 wherein said controller includes means for calculating a desired force based upon a control algorithm, means for comparing a manipulation of said signal indicative of said force condition of said system to said desired force, means for commanding storage of excess of said energy in storable form via control of said energy management element if said desired force can be adequately generated by said energy transformer, means for commanding release of said energy in storable form from said storage element via control of said energy management element when said desired force cannot be adequately generated by said energy transformer such that said desired force dictated by said control algorithm is substantially tracked, and said energy management element includes means for pulse width modulating between a full off state and a full on state at high frequency to substantially track said desired force on the average, thereby reducing the losses associated with commanding said energy management element to an intermediate setting.

12. The controllable mount of claim 7 wherein said first member is an engine and said second member is a support and said controllable mount includes means for attaching to said engine and said support.

13. The controllable mount of claim 7 wherein said energy transformer includes a coil and a magnet, said energy storage element is a capacitor, said energy management element is a plurality of electrical switches, and said sensor is a force sensor.

14. A regenerative actuator for interconnecting a first member and a second member which undergo relative motion, said regenerative actuator operating without an auxiliary power source for actively providing assisting and comprising:

a) an energy transformer including a piston slidably received within an cylinder thus forming two opposed fluid chambers, said energy transformer capable of transforming kinetic energy from said relative motion within a cycle between said first and said second members to a fluid pressure which is an energy in storable form, and for later, within said same cycle, utilizing said energy in storable form for doing useful work to reduce said relative motion;

b) an energy storage element including an accumulator for storing said energy in storable form captured by said energy transformer;

c) a sensor for sensing a force condition of said regenerative actuator;

d) an energy management element including a network of valves for channeling said energy in storable form to and from said energy storage element; and e) a controller responsive to said sensor for controlling said network of valves such that said channeling of said energy in storable form to and from said energy storage element is controlled such that energy is stored during one portion of the operating cycle and energy is released during a later portion of said operating cycle to provide assisting forces without an auxiliary power source for driving said energy transformer for actively providing assisting forces.

15. An actuator of claim 14 wherein said network of valves includes a spool valve.

16. An actuator of claim 14 further including a valve formed between said opposed fluid chambers to relieve pressure differentials between said opposed fluid chambers.

17. An actuator of claim 14 further including means for calculating a desired force derived from a control algorithm, means for comparing said desired force to said force condition, means for commanding said energy management element to accomplish one from the group consisting of storing energy and releasing energy from said energy storage element, and means for modulating said network of valves between a full on state and a full off state to reduce losses associated with commanding said network of valves to an intermediate state.

18. An actuator of claim 14 wherein said first member is a suspension component and said second member is one from the group consisting of a body and a frame.

19. An actuator of claim 14 wherein said first member is a seat and said second member is a seat support.

20. An actuator of claim 14 wherein said first member is a cab and said second member is a frame.

\* \* \* \* \*